United States Patent [19]

Knox

[11] Patent Number: 5,096,960
[45] Date of Patent: Mar. 17, 1992

[54] WATER-BORNE ALKYD RESIN COMPOSITIONS

[75] Inventor: David E. Knox, Goose Creek, S.C.

[73] Assignee: Westvaco Corporation, New York, N.Y.

[21] Appl. No.: 552,936

[22] Filed: Jul. 16, 1990

[51] Int. Cl.$^5$ .............................................. C08L 67/08
[52] U.S. Cl. .................................... 524/601; 524/604; 524/605; 525/7; 525/43; 525/437; 525/444.5; 525/445; 528/272; 528/274; 528/295.5; 528/296; 528/298; 528/302; 528/303; 528/306; 528/307; 528/308; 528/308.6
[58] Field of Search ....................... 524/601, 604, 605; 525/7, 43, 437, 444.5, 445; 528/272, 274, 295.5, 296, 298, 302, 303, 306, 307, 308, 308.6

[56] References Cited

U.S. PATENT DOCUMENTS

| | | | |
|---|---|---|---|
| 4,288,351 | 9/1981 | Miller et al. | 524/512 |
| 4,346,044 | 8/1982 | Dhein et al. | 260/404.8 |
| 4,436,849 | 3/1984 | Aihara et al. | 523/501 |

*Primary Examiner*—John Kight, III
*Assistant Examiner*—S. A. Acquah
*Attorney, Agent, or Firm*—Terry B. McDaniel; Daniel B. Reece, IV; Richard L. Schmalz

[57] ABSTRACT

Water-borne alkyd resin compositions are disclosed comprising maleinized fatty acid. Substitution of the aromatic triacid component of the composition with the maleinized fatty acid permits a reduction in the amount of organic cosolvent employed to solubilize the resin in the water.

16 Claims, No Drawings

WATER-BORNE ALKYD RESIN COMPOSITIONS

BACKGROUND OF THE INVENTION

1. Field of the Invention

This invention relates to a novel composition of matter for reducing cosolvent quantities in water-borne resins. Particularly, this invention relates to a novel composition of matter that has been found to give good film forming characteristics from cosolvent/aqueous media and improved impact resistance. More particularly, this invention relates to a novel water-borne composition that can be reacted to higher molecular weight than standard trimellitic anhydride resins without gelling. The invention composition permits the use of less amounts of environmentally dangerous cosolvents in an aqueous alkyd system.

2. Description of the Prior Art

In water-borne alkyd coatings, the reduction of organic cosolvents is important since they contribute to the amount of volatile organic compounds (VOC's) in the system. Historically, the use of trifunctional acids such as trimellitic anhydride has been the preferred method of solubilizing preformed alkyd resins into an aqueous medium. Alkyd resins are presynthesized to an acid number of about ten and then further reacted with trimellitic anhydride to an acid number of about 45 to 50 to form resins that may be neutralized with base to provide water soluble resins (Amoco Technical Bulletin GSTR 21).

A main deficiency of this technology is the need for a relatively large amount of organic cosolvent in the mixture to maintain solubility. The organic cosolvents that are commonly employed include acetone, butanol, secondary butanol, cyclohexanone, ethylene glycol monobutyl ether, and methyl isopropyl ketone. The chief characteristic of these solvents is that they are at least partially water soluble and have the ability to interact with the water-borne resin to maintain its solubility. Although these water/cosolvent/resin compositions give reasonable properties, the fact that relatively large amounts of cosolvent must be employed means that a large amount of organic material escapes into the environment during processing and application leading to pollution. Although alternative systems to alkyds exist, such as epoxies and acrylics, these latter suffer from deficiencies such as very high price and relative difficulty in application in the case of epoxies and poorer properties with an acrylic.

Therefore, it is the object of this invention to have an alkyd composition that addresses environmental concerns by effectively reducing the amount of cosolvent in the system. In addition, organic cosolvents are frequently expensive and any means of reducing their presence would lead to lowered costs for a paint.

SUMMARY OF THE INVENTION

The object of this invention is met by the use of maleinized fatty acid, preferably oleic, linoleic, or linolenic, more preferably oleic, in water-borne alkyds in lieu of aromatic triacids (e.g., trimellitic anhydride). The maleinized fatty acid substitution gives systems which may be formulated with less cosolvent than their aromatic counterparts. This finding is significant since it would provide a means of both reducing the amount of volatile organic material in the system and reducing costs for paint manufacturers.

DESCRIPTION OF THE PREFERRED EMBODIMENTS

Water-borne alkyd paint systems frequently contain water-soluble organic cosolvents. Included in this list of potential cosolvents are such materials as:

butanol
secondary butanol
cyclohexanone
acetone
methyl isopropyl ketone
methyl isobutyl ketone
ethyleneglycolmonobutyl ether
ethylene glycol monomethyl ether
ethylene glycol monoethyl ether
propylene glycol monobutyl ether This list is intended to be representative and it will be obvious to those skilled in the art that a variety of other solvents and combinations thereof can be used. Therefore, other solvents or combinations which reduce viscosity can be considered part of this invention when used with the described composition of matter below. This invention describes an effective means of reducing the amount of cosolvents such as those listed above while still obtaining good film-forming characteristics. Most water-borne alkyd based paints require the use of a trifunctional acid or acid-anhydride to obtain sufficient acidity for neutralization and subsequent solubilization in water. The trifunctional materials currently employed are well suited to the requirements of water-borne alkyds except they require a significant amount of cosolvent to maintain solubility and give good film forming characteristics. Most formulations appear to be based on trimellitic anhydride since it has the very highly reactive anhydride linkage which can be reacted with the residual hydroxyls in the alkyd system. Presumably, other aromatic or aliphatic triacids could be used but they are not as reactive as trimellitic anhydride and can give gelation in the alkyd since they have similar reactivity in their carboxylic acid groups. For the purpose of describing this invention, trimellitic anhydride is considered as the comparative prior art trifunctional material since it is the most readily available commercial product (Amoco Chemicals) and also has the desired reactivity in the anhydride linkages.

It has been discovered that use of acid-anhydrides derived from the reaction of maleic anhydride with either oleic, linoleic, or linolenic acids serve a similar function as trimellitic anhydride in regards to reacting with the hydroxyls of an alkyd system and providing adequate acidity for neutralization and solubilization. The oleic acid adduct is most preferred in this invention since it combines more readily with the initial alkyd resin than, for example, the linoleic or linolenic adducts. Significantly, these materials, when used according to the descriptions of this invention, can substantially reduce the viscosity of resins in cosolvent media when substituted for aromatic moieties at the same solids level. Film properties are not seriously affected. An alternative embodiment is to formulate the resins to similar viscosities. The maleinized fatty acid derived resins require less solvent. This finding is unexpected since the trifunctional materials, either aromatic or aliphatic, traditionally serve only to couple the main polymer backbone of the alkyd resin and are present in relatively small quantities. Therefore, larger quantities of material would be expected to be needed to obtain the large viscosity decreases observed. In fact, molecular weights of alkyd resins synthesized from fatty acid derived materials are frequently higher than corresponding resins obtained from aromatic trifunctional materials; higher molecular weights would be expected to give larger viscosities. Indeed, it is possible to react the maleinized fatty acid resins to a lower acid (higher molecular weight) value than the trifunctional aromatic moieties and still maintain good solubility characteristics. Viscosity data for the different resins at different solids levels are given in Table I.

TABLE I

Representative Viscosity Values at Different Percent Solids Loadings for Alkyd Resins

| % Solids | Trimellitic Anhydride Resin | Maleinized Fatty Acid Resin |
|---|---|---|
| 75 | 13600 | 6232 |
| 80 | 41200 | 16360 |
| 85 | 83000 | 34800 |

At eighty percent solids the maleinized fatty acid (MFA), in this case maleinized oleic, has a slightly larger viscosity than the trimellitic anhydride (TMA) system at 75% solids; both viscosities are considered within the range of workable water borne systems (up to about 50,000 centipoise). At 85% solids the viscosity of the TMA resin is too large to be workable whereas at this solids level the MFA resin is still able to be handled. Results of formulating these different resins into aqueous solutions are shown below in Table II (final solids of systems are approximately 35%).

TABLE II

Appearance of Aqueous Formulations of Alkyds

| % Solids | Trimellitic Anhydride Resin | Maleinized Fatty Acid Resin |
|---|---|---|
| 75 | clear | clear |
| 80 | cloudy | clear |
| 85 | cloudy with ppt. | cloudy |

At higher solids content based on initial formulation with organic cosolvent, it is evident that resins based on MFA give better solubility characteristics than TMA based resins. Although partially soluble resins (cloudy) might give good films in these cases, clarity of the solution generally correlates with film quality as judged by levelling and dry times. Thus, TMA resins, when drawn down to films do not give good levelling properties when formulated at either 80 or 85% solids in initial organic cosolvent. MFA resins, on the other hand, give good results when formulated from either 75 or 80% solids; with 85% solids reasonable properties were obtained although film leveling was of slightly poorer quality than at higher volatile organic content (lower solids) levels. Since the MFA based resins may be effectively used at an 80% solids level in initial organic cosolvent, it is possible to reduce the amount of cosolvent in the system and still obtain desired good film forming properties compared with trimellitic anhydride. In going from 75% to 80% solids the amount of solvent is reduce by 20% (20% VOC/25% VOC = 80% of the original VOC).

Physical properties of the different resins described above are shown in Table III. Data indicate that the physical properties of the systems are essentially equal; this similarity exists for the TMA resin at 75% solids, and the MFA resins at both 75 and 80% solids. One significant difference between the systems is the impact resistance; those resins containing the MFA have considerably higher impact resistance than those with TMA. This is yet another added benefit of using MFA in lieu of TMA in water dispersible alkyd systems.

TABLE III

Properties of Alkyds

| Entry | Description | Dry Time | Pencil Hardness | Sward Hardness | Impact Front | Impact Reverse | Flexibility | Adhesion |
|---|---|---|---|---|---|---|---|---|
| 1 | TMA-75% Solids | 1 hr. | F | 72 | 160 | 170 | >32% | 95% (4B) |
| 2 | TMA-80% Solids | | | Precipitation/viscosity problems | | | | |
| 3 | TMA-85% Solids | | | Could not adequately film form | | | | |
| 4 | ENE-75% Solids | 5 hr. | 2B | 36 | 160 | 160 | >32% | 100% (5B) |
| 5 | ENE-80% Solids | 5 hr. | B | 26 | 160 | 160 | >32% | 100% (5B) |

A resin typical of this invention consists of a drying oil fatty acid consisting of, but not limited to:
- Pamolyn 200 (80% linoleic acid; 20% oleic acid - Hercules)
- tung oil fatty acid
- linseed oil fatty acid
- soya fatty acid
- tall oil fatty acid
- safflower fatty acid The proportion of fatty acid present in the alkyd is between 20 to 80% by weight and preferably between 35 and 65% by weight. Alternatively, corresponding glycerides of the above materials may be used as will be obvious to those skilled in the art.

Also, a difunctional acid is used in the first stage of synthesis of the resin. This difunctional acid may be taken from any one or a combination of the following. This list is not intended to be limiting:
- isophthalic acid
- phthalic anhydride
- terephthalic acid
- isomeric naphthalene dicarboxylic acids The diacids are present at between 10% and 50% by weight and preferably between 20% and 40% by weight.

In addition, a trifunctional alcohol is used in the reaction of first stage alkyd resin. This trifunctional alcohol may be taken from the list of materials below, but is not limited by them:
- trimetholylpropane
- trimetholylethane
- glycerol Triols are present at levels of between 2% and 40% of the alkyd weight and preferably between 5% and 35% by weight.

Finally, during the synthesis of the first stage alkyd resin a difunctional alcohol is used. Suitable diols are indicated, but not limited by:
- neopentyl glycol
- butanediol hexanediol
cyclohexane diols
ethylene glycol
propylene glycol Diols may be used in weight proportions between 2% and 40% and preferably between 5% and 35% by weight. Tetraols (4 OH's), pentaols (5 OH's), and hexaols (6 OH's) are also known and may be used in substitution for the above triols and diols when substituted on an equivalent weight basis.

When the above reactants are combined in suitable proportions and reacted they form a first stage resin which in a second stage reaction with either trimellitic anhydride or maleinized fatty acid give the final desired alkyd resin. The amount of maleinized fatty acid employed is from about 5% to about 35%, preferably from about 15% to about 25%, by weight of the first stage resin. Suitable proportions of the components may be calculated according to well known alkyd formulating equations by those skilled in the art. A description of these calculations is also given in *Alkyd Resin Technology -Formulating Techniques and Allied Calculations*, T. C. Patton, Interscience Pub., 1962, pp. 100–102. This final alkyd resin is subsequently solubilized by neutralization into an aqueous medium with a volatile amine which includes, but is not limited to, ammonia, ammonium hydroxide, methyl amine, dimethyl amine, trimethyl amine, dimethyl ethanolamine, ethyl amine, and dimethyl amine.

This examples are representative of the practice of this invention:

EXAMPLE 1

The following example is a typical first stage resin commercial formulation.

Pamolyn 200 (Hercules, linoleic acid) is combined with trimethylolpropane, and neopentyl glycol in a resin kettle or other suitable flask. After heating to melting with sparging (nitrogen), the isophthalic acid is added and heating is continued at a temperature of about 240° C. until an acid number of below 10 is obtained. The amounts of various components that are necessary for the first step of this sequence are shown below (based on parts by weight):

| Materials | Parts by Weight |
| --- | --- |
| Pamolyn 200 | 366.8 |
| Trimetholylpropane | 202.8 |
| Neopentyl Glycol | 115.5 |
| Isophthalic Acid | 307.2 |

This first stage resin may then be used when combined with an acid-anhydride (or corresponding triacid) to generate the desired final second stage resin for use in water-borne paints.

EXAMPLE 2

The resin described in Example 1 was taken at 170° C. and reacted with 101.7 parts of trimellitic anhydride. This mixture was allowed to reach an acid number of between 45 to 50 and diluted with solvent in the following manner:

The reaction mixture was cooled to about 150° C. and a suitable amount of ethylene glycol monobutyl ether (EGMBE) was added so that it will constitute 40% of the 25% volatile material in the system. This amount may be calculated by the following equation:

$$\frac{(\text{final wt. of resin} - \text{water of esterification})}{0.75} =$$

$$(\text{final wt. of resin} - \text{water of esterification}) \times$$

$$0.10 = \text{wt of EGMBE}$$

After addition of the EGMBE the resin solution was further cooled to below 100° C. and then a suitable amount of secondary butanol was added so that it will constitute 60% of the 25% material in the system. This amount may be calculated by an equation similar to the one shown in step 3.

EXAMPLE 3

The resin of Example 2, at 75% solids (25.6 parts by weight) was diluted with water (43.9 parts) and 28% ammonium hydroxide (1.15 parts). To this was added suitable driers such as cobalt, calcium and zirconium to give effective curing; optionally, anti-skinning agents may be employed if needed. Finally, pigment (titanium dioxide, 17.3 parts) and additional secondary butanol (2.1 parts), EGMBE (1.4 parts) and deionized water (7.5 parts) were added. Pigmentation is not necessary in order to study the film properties. Finally, the resin pH is adjusted to 8.5. Drawn down films of about 1 mm thickness were prepared from this final aqueous solution. All testing was done on this type film.

EXAMPLE 4

A resin was synthesized and formulated in a fashion analogous to Example 2 above except that instead of TMA, maleinized fatty acid was employed. The difference incorporated in this procedure in contrast to Example 2 was that 195.1 parts by weight of MFA were used instead of 101.7 parts by weight of TMA during the synthesis of the resin.

MFA resins were generally reacted to a slightly lower acid number of between 32–42. Although good films are still obtained at higher acid values of between 45 to 50 the lower acid number resins have higher molecular weight distributions and require less neutralizing ammonia. Resins reacted below an acid number of about 32 generally are not as soluble as desired in the final formulation and the risk of gelation during reaction is greatly increased.

Use of this slightly different procedure resulted in resins with comparable properties to the TMA based systems.

EXAMPLE 5

In a fashion analogous to Example 3, the resin described in Example 4 was solubilized in water with the exception that it is necessary to neutralize this material to a pH of about 10 to insure long-term shelf life. This distinguishes the invention resins from the prior art resins and indicates the uniqueness of the claimed composition. Generally accepted formulation techniques would only call for a resin to be neutralized to a pH of between 8.5 and 9.5. With the invention resin, only at a higher pH of from about 9.5 to about 11.0, is stability obtained.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A water-borne alkyd resin composition comprising a fatty acid drying component, a trifunctional alcohol, a difunctional alcohol, a difunctional acid, and a maleinized fatty acid.

2. The composition of claim 1 wherein the fatty acid drying component comprises a vegetable oil containing from about 2% to about 98% linoleic acid and linolenic acid.

3. The composition of claim 1 wherein the fatty acid drying component comprises a blend of 80% linoleic acid and 20% oleic acid.

4. The composition of claim 2 wherein the vegetable oil is selected from the group consisting of tung oil fatty acid, linseed oil fatty acid, soya fatty acid, cottonseed fatty acid, corn oil fatty acid, and safflower oil fatty acid, the trifunctional alcohol is selected from the group consisting of trimetholylpropane, trimetholyl ethane, and glycerol, the difunctional acid is selected from the group consisting of isophthalic acid, phthalic anhydride, terephthalic acid, isomeric naphthalene dicarboxylic acid, and combinations thereof, and the difunctional alcohol is selected from the group consisting of neopentyl glycol, butanediol, hexanediol, cyclohexane diols, ethylene glycol, and propylene glycol.

5. The composition of claim 1 wherein the solids levels are up to 85%, based on initial reduction of the fatty acid drying component, the trifunctional alcohol, the difunctional alcohol, a difunctional acid, and the maleinized fatty acid into a cosolvent.

6. The composition of claim 1 wherein the maleinized fatty acid is selected from the group consisting of maleinized oleic acid, maleinized linoleic acid, and maleinized linolenic acid.

7. An improved water-borne alkyd resin composition including an aromatic triacid compound and an amount of an organic cosolvent wherein the improvement comprises reducing the amount of organic cosolvent by substituting maleinized fatty acid for the aromatic triacid.

8. The improved composition of claim 7 wherein the aromatic triacid is trimellitic anhydride and the maleinized fatty acid is selected from the group consisting of maleinized oleic acid, maleinized linoleic acid, and maleinized linolenic acid.

9. The improved composition of claim 8 wherein the maleinized fatty acid is maleinized oleic acid and the organic cosolvent is selected from the group consisting of acetone, butanol, secondary butanol, cyclohexanone, ethylene glycol monobutyl ether, methyl isopropyl ketone, and mixtures thereof.

10. A method of preparing a water-borne alkyd resin composition comprising the steps of (1) preparing a first stage resin comprising the reaction product of a drying oil fatty acid, a difunctional acid, a trifunctional alcohol, and a difunctional alcohol, (2) subsequently reacting the first stage resin with a maleinized fatty acid to form a second stage resin and (3) solubilizing the second stage resin by mixing with organic cosolvent and water and neutralizing to a pH of 9.5–11.0.

11. The method of claim 10 wherein the drying oil fatty acid is selected from the group consisting of tung oil fatty acid, linseed oil fatty acid, soya fatty acid, tall oil fatty acid, and safflower fatty acid, the difunctional acid is selected from the group of isophthalic acid, phthalic anhydride terephthalic acid, and isomeric naphthalene dicarboxylic acids, the trifunctional alcohol is selected from the group consisting of trimetholylethane, trimetholylpropane, and glycerol, the difunctional alcohol is selected from the group consisting of neopentyl glycol, butanediol, hexanediol, cyclohexane diols, ethylene glycol, and propylene glycol, and the maleinized fatty acid is selected from the group consisting of maleinized oleic acid, maleinized linoleic acid, and maleinized linolenic acid.

12. The method of claim 11 wherein the maleinized fatty acid is maleinized oleic acid.

13. The method of claim 11 wherein the first stage resin comprises from about 20% to about 80% fatty acid drying component, from about 2% to about 40% of the trifunctional alcohol, from about 2% to about 40% of the difunctional alcohol, and from about 10% to about 50% of the difunctional acid.

14. The method of claim 11 wherein the maleinized fatty acid is present in an amount from about 5% to about 35% by weight of the first stage resin.

15. The method of claim 11 wherein the second stage resin is solubilized by mixing with an amount of organic cosolvent sufficient to result in an alkyd resin composition viscosity of no greater than 50,000 centipoise at up to 85% solids.

16. The method of claim 10 wherein the organic cosolvent is selected from the group consisting of acetone, butanol, secondary butanol, cyclohexanone, ethylene glycol monobutyl ether, and methyl isopropyl ketone.

* * * * *